US012688109B2

(12) United States Patent
Padmanabhan et al.

(10) Patent No.: US 12,688,109 B2
(45) Date of Patent: *Jul. 21, 2026

(54) AUTOMATED DETERMINATION OF WEB PAGE RENDERING PERFORMANCE

(71) Applicant: eBay Inc., San Jose, CA (US)

(72) Inventors: Senthil Kumar Padmanabhan, San Jose, CA (US); Srikanth Rentachintala, San Jose, CA (US); Kandakumar Doraisamy, Dublin, CA (US); Namrata Mummaneni, San Jose, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/956,062

(22) Filed: Nov. 22, 2024

(65) Prior Publication Data

US 2025/0086089 A1 Mar. 13, 2025

Related U.S. Application Data

(63) Continuation of application No. 17/465,570, filed on Sep. 2, 2021, now Pat. No. 12,189,508, which is a
(Continued)

(51) Int. Cl.
*G06F 16/00* (2019.01)
*G06F 3/04842* (2022.01)
(Continued)

(52) U.S. Cl.
CPC ...... *G06F 11/3457* (2013.01); *G06F 3/04842* (2013.01); *G06F 16/9577* (2019.01); *G06F 16/958* (2019.01); *H04L 67/535* (2022.05)

(58) Field of Classification Search
CPC .. G06F 3/0488; G06F 11/3457; G06F 16/958; G06F 16/957; G06F 3/04842; H04L 67/535; H04L 67/75
See application file for complete search history.

(56) References Cited

U.S. PATENT DOCUMENTS

| | | |
|---|---|---|
| 12,189,508 B2 | 1/2025 | Padmanabhan et al. |
| 2011/0161892 A1* | 6/2011 | Hamadene ............ G06F 3/0485 |
| | | 715/863 |

(Continued)

OTHER PUBLICATIONS

Jose A. Gil, "The Impact of User-Browser Interaction On Web Performance," SAC'13 Mar. 18-22, 2013, pp. 695-702 (Year: 2013).*

(Continued)

*Primary Examiner* — Cheryl Lewis
(74) *Attorney, Agent, or Firm* — FIG. 1 Patents

(57) ABSTRACT

Automated determination of web page rendering performance techniques and systems are described. In one example, a web page including multiple user-interactive elements that can be selected or navigated via user input is received. A frame rendering system is employed to automatically identify the user-interactive elements and generate scripts to simulate user input at the user-interactive elements. The generated scripts are then used to simulate user input at the user-interactive elements. The scripts may be generated to simulate user interaction via a variety of different device types, and under a variety of different network conditions. During the simulation, a rendering performance score for the web page is generated by monitoring rendering performance relative to a threshold rendering rate. Rendering performance may be monitored on an individual basis while simulating user input at different user-interactive elements, such that the rendering performance report includes individual rendering performance scores for each user-interactive element.

20 Claims, 7 Drawing Sheets
(4 of 7 Drawing Sheet(s) Filed in Color)

Related U.S. Application Data continuation of application No. 16/145,566, filed on Sep. 28, 2018, now Pat. No. 11,157,383.

(51) Int. Cl.

| | | |
|---|---|---|
| *G06F 11/34* | (2006.01) | |
| *G06F 16/957* | (2019.01) | |
| *G06F 16/958* | (2019.01) | |
| *H04L 67/50* | (2022.01) | |

(56) References Cited

U.S. PATENT DOCUMENTS

| | | | | |
|---|---|---|---|---|
| 2015/0042572 A1* | 2/2015 | Lombardi | ............. | G06F 3/0488 |
| | | | | 345/173 |
| 2021/0397535 A1 | 12/2021 | Padmanabhan et al. | | |
| 2024/0054996 A1* | 2/2024 | Vescovi | .................. | G10L 15/19 |

OTHER PUBLICATIONS

"Final Office Action", U.S. Appl. No. 17/465,570, Apr. 24, 2024, 17 pages.

"Non-Final Office Action", U.S. Appl. No. 17/465,570, Feb. 1, 2024, 14 pages.

"Notice of Allowance", U.S. Appl. No. 17/465,570, Oct. 11, 2024, 12 pages.

* cited by examiner

200

102

202

106

210

212

204

208

206

400

600

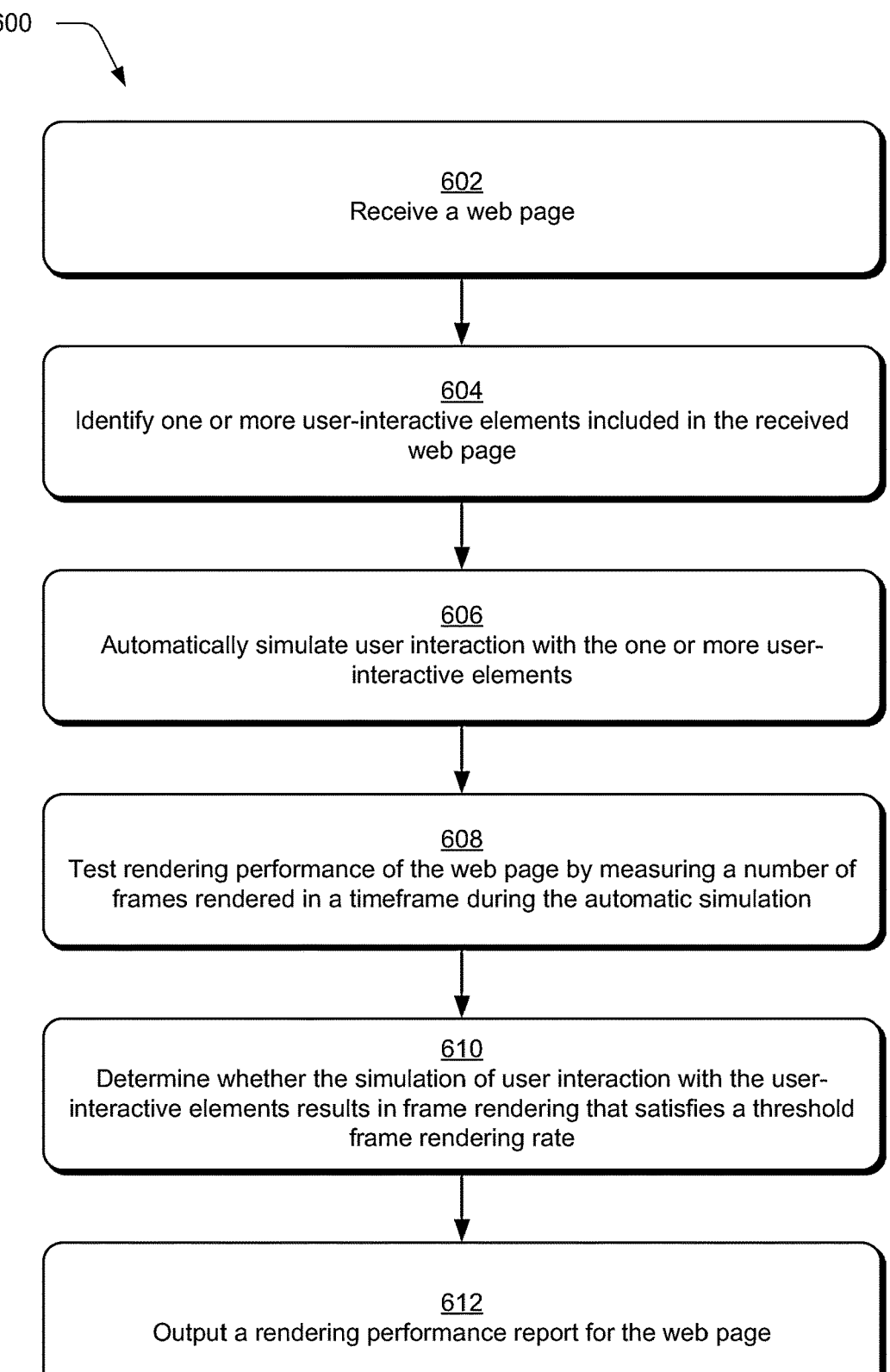

602
Receive a web page

604
Identify one or more user-interactive elements included in the received web page

606
Automatically simulate user interaction with the one or more user-interactive elements

608
Test rendering performance of the web page by measuring a number of frames rendered in a timeframe during the automatic simulation

610
Determine whether the simulation of user interaction with the user-interactive elements results in frame rendering that satisfies a threshold frame rendering rate

612
Output a rendering performance report for the web page

AUTOMATED DETERMINATION OF WEB PAGE RENDERING PERFORMANCE

RELATED APPLICATIONS

This application is a continuation of and claims priority to U.S. patent application Ser. No. 17/465,570, filed Sep. 2, 2021, now U.S. Pat. No. 12,189,508, entitled "Automated Determination of Web Page Rendering Performance," which is a continuation of and claims priority to U.S. patent application Ser. No. 16/145,566, filed Sep. 28, 2018, now U.S. Pat. No. 11,157,383, entitled "Automated Determination of Web Page Rendering Performance," the disclosures of which are hereby incorporated by reference their entireties.

BACKGROUND

Users interact with digital content via web pages across an increasing range of digital devices. To ensure a smooth user experience, web page developers design web pages to render at a minimum threshold frame rate. Ensuring that web pages render at a minimum threshold frame rate, however, is particularly difficult for devices with slow network connections and for mobile devices having limited computational processing resources. As a result, accessing a web page via devices with limited processing resources or slow network connections often results in a poor rendering performance of the web page, such as slow rendering of web page elements, rendering the web page with perceptible lapses between individually rendered frames of the web page, and so forth. In some instances, a rendering performance of the web page is dependent on a screen refresh rate for a device displaying the web page, where a web page will have a poor rendering performance if the device displaying the web page is unable to render new frames for the web page during user interaction at a rate that is at least equal to the screen refresh rate. In situations where a device is unable to render frames of a web page at a rate that is at least equal to the screen refresh rate, web page content appears to visually judder, commonly referred to as "jank", which negatively impacts a user's experience with the web page. Thus, the rendering performance of a web page is often dependent on a number and type of user-interactive elements included in the web page, as additional user-interactive elements require greater processing resources and network bandwidth to smoothly render.

To address web page rendering performance issues, web page developers are often forced to redesign the web page itself, often by removing user-interactive elements which would otherwise be included in the web page. Conventional approaches for determining whether a web page will render at a minimum frame rate, however, require manually interacting with various user-interactive elements while measuring a rate at which frames of the web page render. For instance, in determining the rendering performance of a web page that includes a vertical scrolling element, a selectable overlay element, and multiple radio button elements, a web page developer must provide manual user inputs to navigate the vertical scroll element and select the overlay and radio button elements, all while monitoring a frame rate at which the web page renders as the developer manually interacts with the web page. This manual process must be repeated for different device types, and under different network conditions for each device type, to determine a rendering performance for the web page under various device and/or network conditions.

Moreover, such conventional approaches for determining web page rendering performance often fail to identify the particular user-interactive elements that are responsible for slowing the rendering below the minimum threshold, forcing web page developers to guess which elements need to be altered or removed to produce a web page that renders at the minimum threshold rate. Accordingly, conventional techniques for determining web page rendering performance remain unintuitive and cumbersome for even experienced web developers.

SUMMARY

Automated determination of web page rendering performance techniques and systems are described herein. In one example, a computing device system receives a web page including multiple user-interactive elements that can be selected or navigated via user input to access functionality of the web page. A frame rendering system is employed to automatically identify the user-interactive elements of the web page and generate automated user interaction scripts to simulate user input at each of the identified user-interactive elements. In some implementations, the frame rendering system identifies and groups user-interactive elements of a web page by type, and generates a single automated user interaction script for each detected type of user-interactive element. The automated user interactions scripts are then applied to the detected user-interactive elements to simulate user input received at the user-interactive elements. Automated user interaction scripts may be generated to simulate user interaction at a variety of different device types, and under a variety of different network conditions.

During the simulation, a rendering performance of the web page is monitored relative to a threshold rendering rate, and report describing an overall rendering performance for the web page is generated based on this monitoring. In some implementations, a rendering performance is monitored on an individual basis for different user-interactive elements of the web page while simulating user input at the different user-interactive elements. In one example, unique identifiers are assigned to different user-interactive elements, and a monitored rendering performance is associated with the unique identifiers, such that the rendering performance report includes individual rendering performance scores for one or more of the user-interactive elements.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The detailed description is described with reference to the accompanying figures. Entities represented in the figures may be indicative of one or more entities and thus reference may be made interchangeably to single or plural forms of the entities in the discussion.

FIG. 6 is a flow diagram depicting a procedure in an example implementation of automated determination of web page rendering performance.

DETAILED DESCRIPTION

Overview

Figure 1:
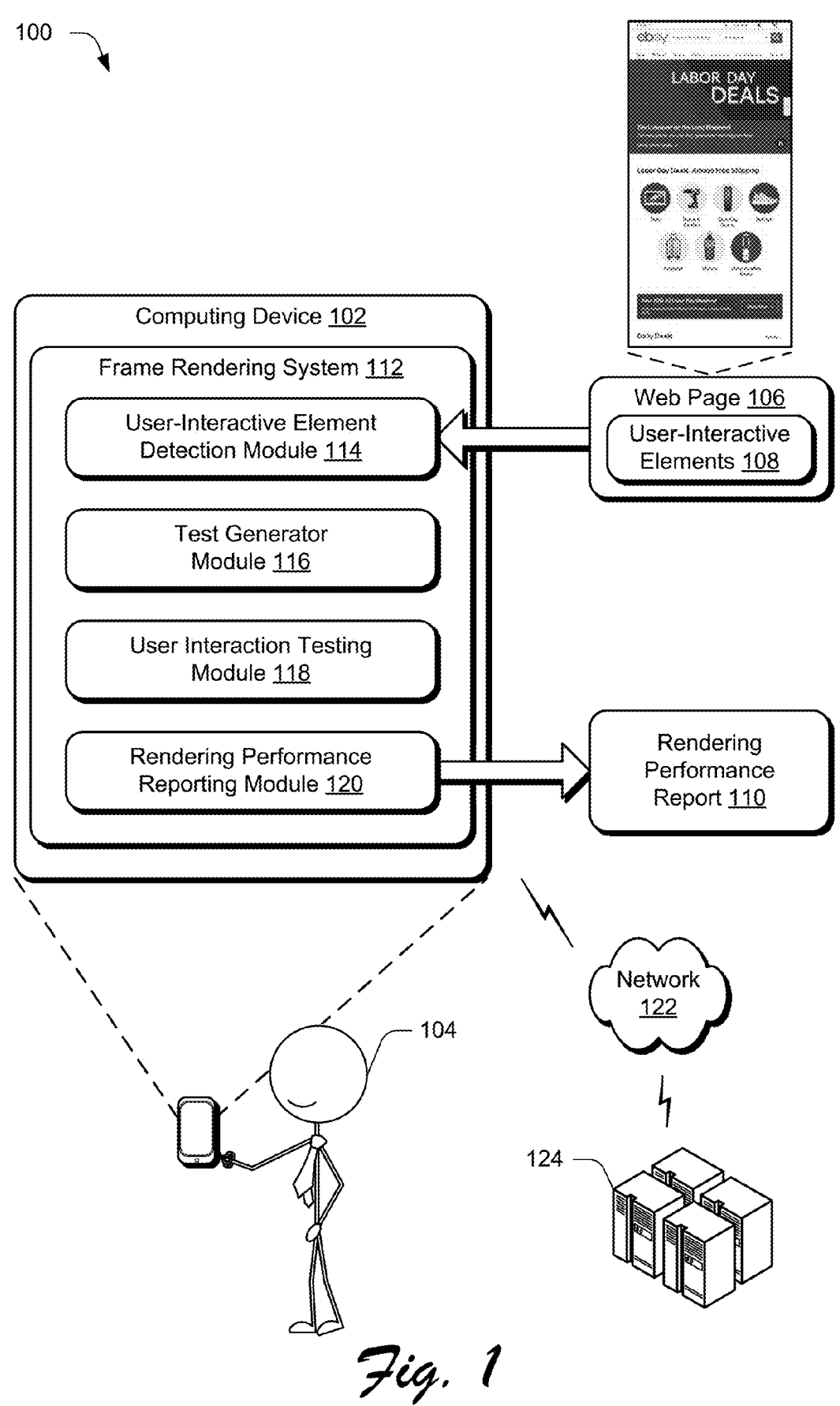
FIG. 1 is an illustration of an environment in an example implementation that is operable to employ automated determination of web page rendering performance techniques described herein.

Conventional techniques for assessing the rendering performance of a web page require web developers to manually interact with various user-interactive elements included in the web page while monitoring a frame rendering rate, and thus typically involve significant amounts of user interaction and expertise. This causes these conventional techniques to be unavailable to average users, and prone to user-error mistakes. Such user-error mistakes may occur, for instance, when a testing web developer forgets to interact with various user-interactive elements. As a result, web pages that appear to render at an acceptable rate on one device under a first set of network conditions often do not render at an acceptable rate on different device types or under different sets of network conditions.

Accordingly, automated determination of web page rendering performance reporting techniques and systems are described. In one example, a web page including one or more user-interactive elements is received at a computing device. Examples of such user-interactive elements include vertical scrolling elements, horizontal scrolling elements, overlay elements, list view elements, drop-down elements, radio button elements, and the like. These various elements may be interacted with via user input to navigate the web page and/or prompt a change in content or information displayed by the web page. Once the web page is obtained, a frame rendering system is employed to automatically generate a rendering performance report for the web page, which describes a rendering performance of the web page under simulated user interaction with the web page at different device types or under different network conditions.

To do so, the frame rendering system first analyzes the received web page and determines what user-interactive elements are included in the web page. In some implementations, the frame rendering system categorizes each detected user-interactive element based on a type of user input that can be used to interact with the element. Additionally, the frame rendering system assigns each detected user-interactive element a unique identifier that is used to attribute a rendering performance with the individual user-interactive element. In order to automatically simulate user interaction with the detected user-interactive elements, the frame rendering system generates automated user interaction scripts that are applied to the user-interactive elements in a manner that mimics manual user input otherwise received at the element(s).

These automated user interaction scripts are then applied to the respective user-interactive element for which the script was generated, and a rendering performance of the web page is monitored during the simulated user interaction. The rendering performance of the web page may be compared to a threshold frame rendering rate to generate an overall rendering performance score for the web page, and to identify whether user interaction with individual ones of the detected user-interactive elements prohibits the web page from rendering at a rate that satisfies the threshold rendering rate. As a result, the frame rendering system described herein automates testing of a web page and produces both an overall rendering performance score for the web page, as well as individual metrics describing the resulting rendering performance of interacting with particular user-interactive elements of a web page, and in a manner that does not require actual, manual user input. By automating the simulation and testing process, the described techniques reduce an amount of time required to determine rendering performance for a web page accessed at different device types or under different network conditions, identify individual elements of a web page that might affect overall rendering performance, assess the rendering performance of a variety of different web page elements in a platform-independent manner, and enable determination of a web page's rendering performance for any user, even one unfamiliar with basic fundamentals of web design. In this manner, these improved methods of determining rendering performance enables the web page to be fixed to acceptable standards by improving a rendering performance of, or removing, elements contributing to deficient rendering performances, and so forth. Other examples are also contemplated, further discussion of which may be found in the following sections and shown in corresponding figures.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ the automated determination of web page rendering performance techniques described herein. The illustrated environment 100 includes a computing device 102 of a user 104 that is configured to receive a web page 106 including one or more user-interactive elements 108. As described herein, the web page 106 refers to a document file written in a markup language, such as Hypertext Markup Language (HTML), that is consumable by a web browser application to present a user interface for the web page at a display device, such as a display device of the computing device 102. The user-interactive elements 108 of the web page 106 include visual elements of a rendered web page that may be interacted with via user input to navigate the web page, cause the web page to change displayed information, and so forth.

For instance, the user-interactive elements 108 may include at least one of a vertical scrolling element that enables navigation of the web page 106 in first and second directions, or a horizontal scrolling element that enables navigation of the web page 106 in third and fourth directions that are generally perpendicular to the first and second directions. Additionally or alternatively, the user-interactive elements 108 may include at least one of an overlay element, a list view element, a radio button element, or a drop-down element, which are described in further detail below with respect to FIGS. 2 and 3. In some implementations, the computing device 102 receives the web page 106 from a service provider 124, such as via a network 122. The computing device 102 may be configured in a variety of manners.

The computing device 102, for instance, may be configured as a desktop computer, a laptop computer, a mobile device (e.g., assuming a handheld configuration such as a tablet or mobile phone as illustrated), and so forth. Thus, a computing device may range from full resource devices with substantial memory and processor resources (e.g., personal computers, game consoles) to a low-resource device with limited memory and/or processing resources (e.g., mobile devices). Additionally, a computing device may be representative of a plurality of different devices, such as multiple servers utilized by a business to perform operations "over the cloud" as illustrated and described in relation to FIG. 7.

Upon receiving the web page 106, the computing device 102 is configured to automatically generate a rendering performance report 110 by employing the frame rendering system 112. As described herein, the rendering performance report 110 includes information describing a frame rendering rate of the web page 106 and its user-interactive elements 108 for at least one device type and/or at least one set of network conditions, relative to a threshold rendering rate. In some implementations, the rendering performance report 110 includes information identifying each of the user-interactive elements 108, along with a rendering performance score describing a rendering rate for the web page 106 during simulated user interaction with the respective user-interactive element.

To do so, the frame rendering system 112 employs a user-interactive element detection module 114 to automatically detect each of the user-interactive elements 108 included in the web page. The detected user-interactive elements 108 are then provided to the test generator module 116, along with an indication of an element type for each of the user-interactive elements 108. In some implementations, the user-interactive elements 108 may be grouped by element type. Upon receipt of the user-interactive elements 108, the test generator module generates automated user interaction scripts for simulating user interaction with each of the user-interactive elements 108. The user-interactive elements 108 and the automated user interaction scripts are then communicated to the user interaction testing module 118, which applies the automated user interaction scripts to the user-interactive elements 108 to simulate manual user input to and interaction with the web page 106. During the simulation, the frame rendering system 112 monitors a frame rendering rate of the web page and communicates this monitored information to the rendering performance reporting module 120. The rendering performance reporting module 120 compares the monitored rendering rate against a threshold frame rendering rate and generates the rendering performance report 110 based on this comparison, thereby automatically describing how a web page will be rendered by different device types and/or under different network conditions, without requiring manual user input to produce the rendering.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Example Web Pages with User-Interactive Elements

Figure 2:
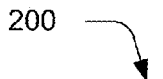
FIG. 2 depicts an example web page including multiple user-interactive elements.

FIG. 2 is an illustration of a digital medium environment 200 in an example implementation of a web page 106 rendered at a display 202 of a computing device, such as computing device 102 of FIG. 1. In the illustrated example, display of the web page 106 is limited by a size of the display 202, such that the computing device 102 is only configured to render a portion of an overall display of the web page 106 at a given time. In the illustrated example, this limited rendering portion is depicted by the dashed line 204, where content of the web page below the dashed line 204 is not currently rendered at the display 202 due to a limited size of the display 202 relative to a rendering size of the web page 106. In order to view and interact with the web page 106, user input may be received at the computing device 102, illustrated by a user's hand 206. In an example implementation where the computing device 102 is configured to receive input via a touch screen integrated into the display 202, user input may be received by the user's hand 206 to navigate display of the web page 106 and alternatively or additionally interact with one or more user-interactive elements of the web page 106.

For instance, in order to view content of the web page 106 included below the dashed line 204, user input may be received via the user's hand 206 scrolling a display of the web page 106 in a generally vertical direction, as indicated by the arrow positioned adjacent to the user's hand 206. Although described and illustrated with respect to a computing device including an integrated touch screen, user input may be received via any manner of input interfaces, such as via I/O interfaces 708, described in further detail with respect to FIG. 7.

In this manner, the web page 106 may itself be a vertical scrolling element 208, such that received user input navigating the web page 106 in a vertical direction causes the computing device 102 to alter a display of content of the web page 106. Continuing this example, user input received by the user's hand 206 moving from a base of the display 202 towards a top of the display 202 would cause the computing device 102 to render content of the web page 106 included below the dashed line 204 at the display 202, and vice versa. Alternatively or additionally, the web page 106 may include one or more vertical scrolling elements 208 that comprise only a portion of the web page's content, such as an embedded text document, a navigable map, and the like that are navigable in a direction generally indicated by the arrow adjacent to the user's hand 206. The vertical scrolling element 208 is thus representative of a user-interactive element 108 included in the web page 106, as illustrated in FIG. 1.

Additionally or alternatively, the web page 106 may include other user-interactive elements 108 that are selectable via user input to interact with content and information provided by the web page 106. For instance, the illustrated example includes a drop-down element 210 and a radio button element 212, each of which are representative of one of the user-interactive elements 108, as illustrated in FIG. 1. As described herein, a drop-down element is a graphical control element that is electable to cause display of one or more selectable options, separate displays of content, additional content displayed within the web page, and so forth, organized in a list format. In some implementations, a display position of the displayed information organized in a list format is anchored to a display position of the list view element. A radio button element, by contrast, is a graphical control element that enables selection of one of a predefined set of mutually exclusive options. User input at one or more of the vertical scrolling element 208, the drop-down element 210, or the radio button element 212 thus causes the computing device 102 to alter a display of the web page 106, which requires rendering different frames of the web page 106 at the display 202.

Figure 3:
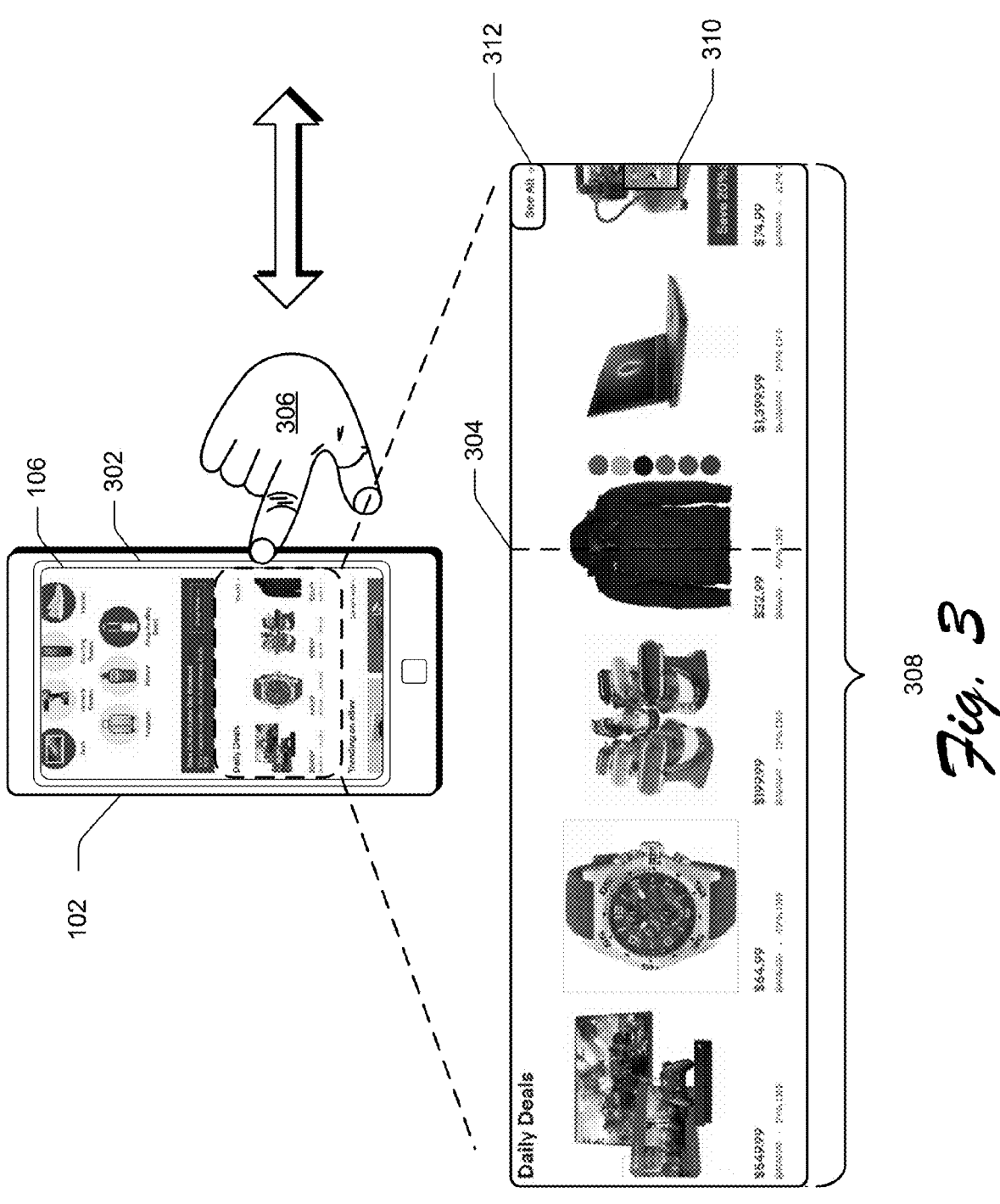
FIG. 3 depicts an example web page including multiple user-interactive elements.

FIG. 3 is an illustration of a digital medium environment 300 in an example implementation of the web page 106 rendered at a display 302, such as the computing device 102 of FIG. 1. In the illustrated example, a display of the web page 106 at the computing device 102 is limited by a size of the display 302, such that the computing device 102 is only configured to render a portion of an overall display of the web page 106 at a given time. In the illustrated example, this limited rendering portion is depicted by the dashed line 304, where content of the web page 106 to the right of the dashed line 304 is not currently rendered at the display 302 due to a limited size of the display 302 relative to an overall size of the web page 106. In order to view and interact with the web page 106, user input may be received at the computing device 102, illustrated generally by the user's hand 306. In an example implementation where the computing device 102 is configured to receive input via a touch screen integrated into the display 302, user input may be received via the user's hand 306 to navigate display of the web page 106 and alternatively or additionally interact with one or more of the web page's user-interactive elements 108.

For instance, in order to view content of the web page 106 located to the right of the dashed line 304, user input may be received via the user's hand 306 scrolling a display of the web page 106 in a generally horizontal direction, as indicated by the arrow positioned adjacent to the user's hand 306. Although described and illustrated with respect to a computing device including an integrated touch screen, user input may be received via any manner of input interfaces, such as via I/O interfaces 708, described in further detail with respect to FIG. 7. In comparison to the vertical direction(s) illustrated by the arrow in FIG. 2, the horizontal direction(s) illustrated by the arrow in FIG. 3 is generally perpendicular to the vertical direction(s) of FIG. 2.

In this manner, the web page 106 may include one or more horizontal scrolling elements 308, such that received user input navigating the horizontal scrolling element 308 in a horizontal direction causes the computing device 102 to alter a display of content included in the horizontal scrolling element 308. Continuing this example, user input received by the user's hand 306 moving from a right of the display 302 towards a left of the display 302 causes the computing device 102 to render content of the horizontal scrolling element 308 included to the right of the dashed line 304, and vice versa. Alternatively, the web page 106 itself may be configured as a horizontal scrolling element, such as a web page configured as a book, where horizontal scrolling is used to turn pages of the book, and so forth. The horizontal scrolling element 308 is thus representative of a user-interactive element 108 included in the web page 106, as illustrated in FIG. 1.

Additionally or alternatively, the web page 106 may include other user-interactive elements 108 that are selectable via user input to interact with content and information provided by the web page 106. For instance, the illustrated example includes an overlay element 310 and a list view element 312, each of which are representative of one of the user-interactive elements 108, as illustrated in FIG. 1. As described herein, an overlay element is a graphical control element that is selectable to cause display of content in a foreground of a user interface for a web page while obstructing display of at least a portion of content displayed in a background of the user interface for the web page. In some implementations, an overlay element may cause display of information at a predefined position of the web page that is not anchored to a location of the overlay element itself. A list view element, by contrast, is a graphical control element that is electable to cause display of one or more selectable options, separate displays of content, additional content displayed within the web page, and so forth, organized in a list format. In some implementations, a display position of the displayed information organized in a list format is anchored to a display position of the list view element.

Although the overlay element 310 and the list view element 312 are illustrated as being included as part of the horizontal scrolling element 308, the various user-interactive elements 108 described herein may be included in any portion of a web page 106. User input received at one or more of the horizontal scrolling element 308, the overlay element 310, or the list view element 312 thus causes the computing device 102 to alter a display of the web page 106, which requires rendering different frames of the web page 106 at the display 302.

Having considered example web pages including user-interactive elements, a frame rendering system is described that is configured to automatically generate a rendering performance report describing a rendering performance of a web page with user-interactive elements under different network conditions and/or at different device types.

Frame Rendering System

Figure 4:
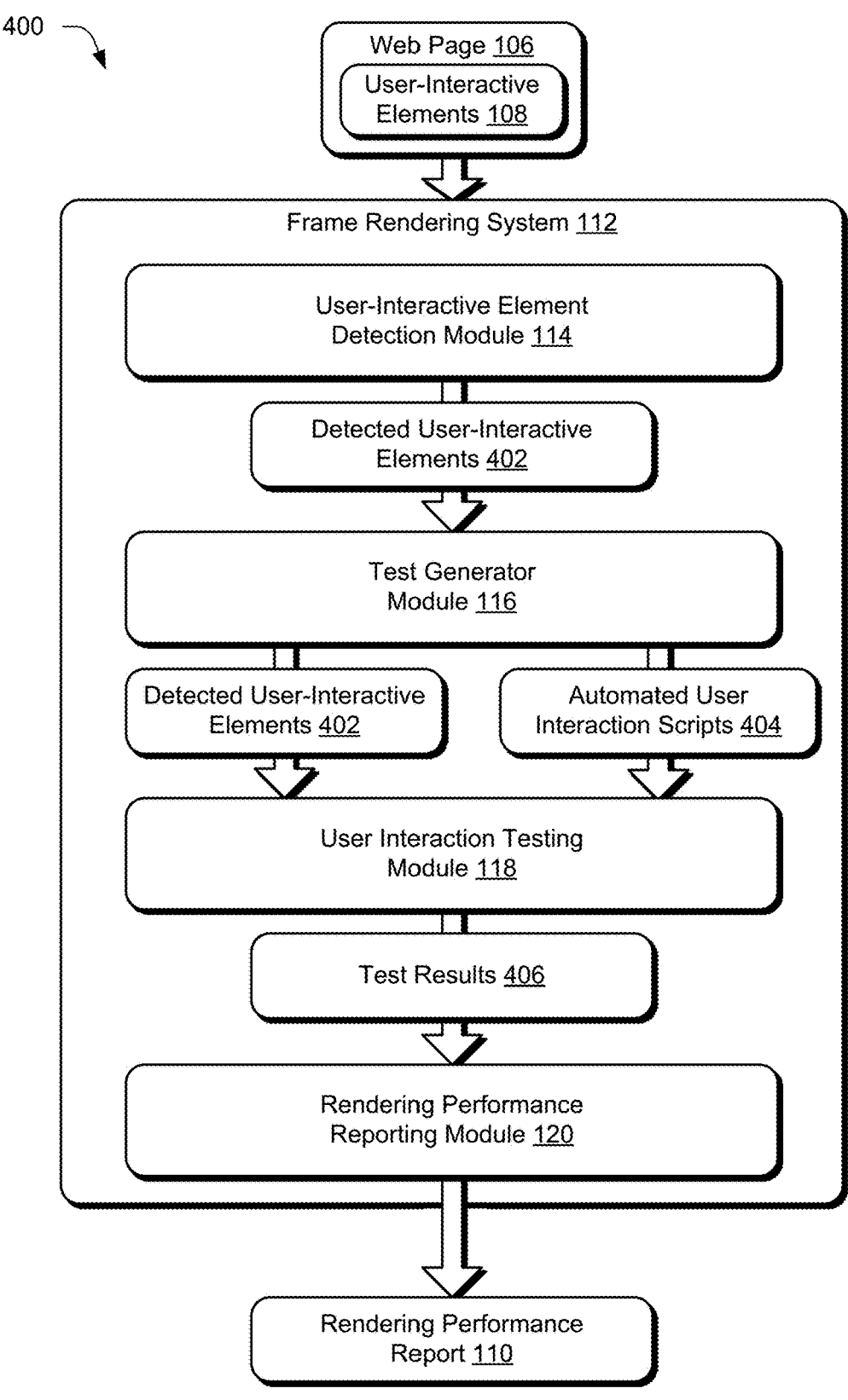
FIG. 4 depicts operation of a frame rendering system generating a rendering performance report for a web page including multiple user-interactive elements.
Figure 5:
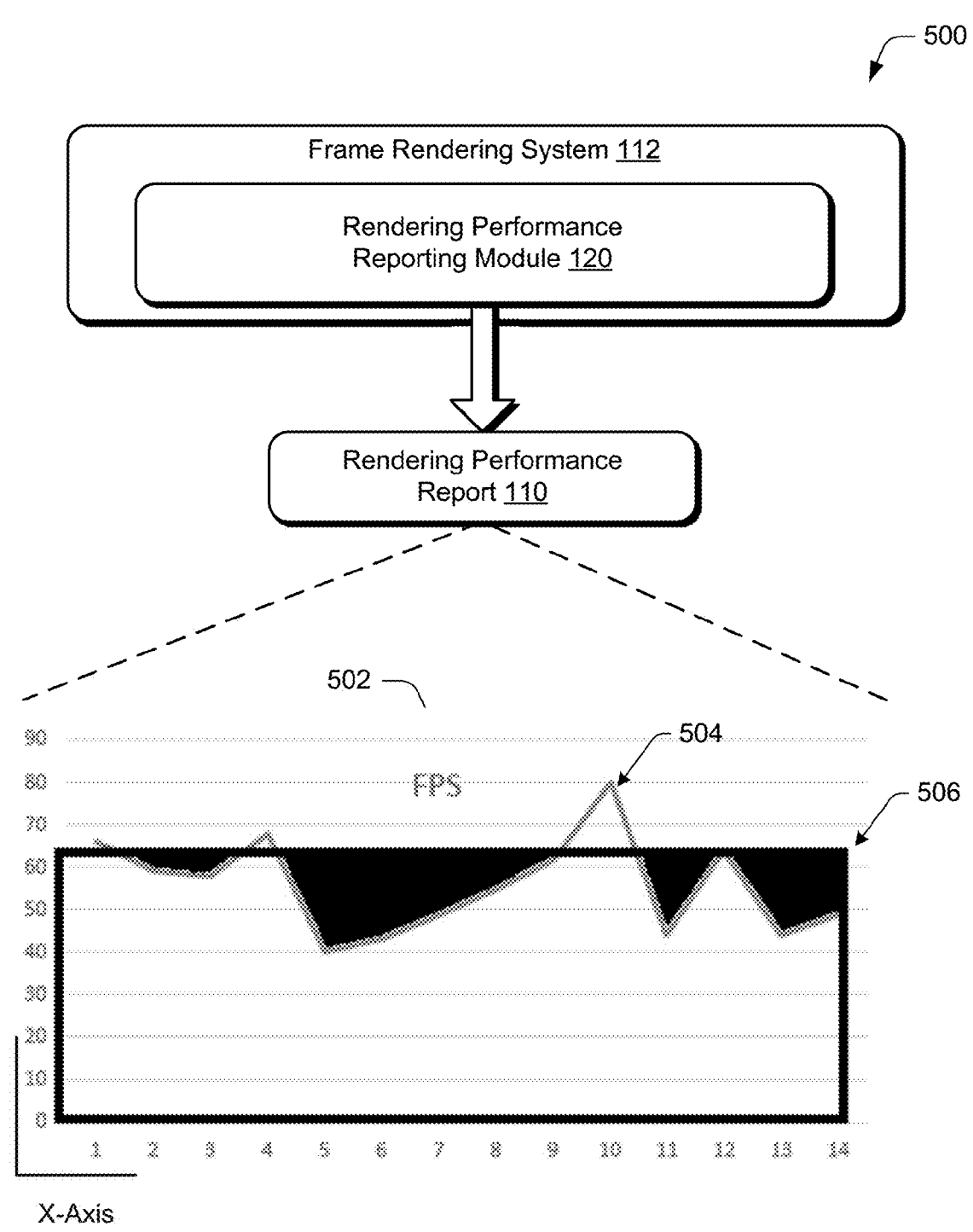
FIG. 5 depicts an example rendering performance report for a web page including multiple user-interactive elements.

FIG. 4 depicts a system 400 showing operation of the frame rendering system 112 of FIG. 1 in greater detail. FIG. 5 depicts a digital medium environment 500 in an example implementation of a rendering performance report 110 generated by the frame rendering system 112. FIG. 6 depicts a procedure 600 in an example implementation in which a rendering performance report is automatically generated by detecting user-interactive elements included in a web page, generating automated user interaction scripts, simulating user interaction with the user-interactive elements using the generated scripts, and generating a rendering performance report based on the simulation.

The following discussion describes techniques that may be implemented utilizing the described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In portions of the following discussion, reference will be made to FIGS. 4-6 interchangeably.

To begin, a web page 106 including one or more user-interactive elements 108 is received at a computing device, such as computing device 102 of FIG. 1 (block 602). The user-interactive elements 108 may include one or more of a vertical scrolling element, a horizontal scrolling element, an overlay element, a list view element, a radio button element, a drop-down element, or combinations thereof. Upon receiving the web page 106, the user-interactive element detection module 114 of the frame rendering system 112 analyzes the web page 106 to identify the one or more user-interactive elements 108 included in the web page 106 (block 604). To do so, the user-interactive element detection module 114 automatically, independent of user input, analyzes the markup language of the web page 106 to determine what user-interactive elements 108 are included in the web page 106. In an example implementation where the web page 106 is coded in HTML, the user-interactive element detection module 114 identifies an HTML identifier attribute of each user-interactive element 108. Alternatively or additionally, the user-interactive element detection module 114 identifies user-interactive elements 108 based on a combination of an HTML identifier attribute and a class name for each user-interactive element 108. Using the techniques described herein, any suitable method may be used to identify visual elements in the web page 106. For instance, in some implementations, selenium methods may be used to identify visual web page elements. In an example scenario where selenium methods are used to identify a horizontal scrolling element, optionally referred to as a "carousel" visual element, the following example script may be used to identify each carousel element in the web page 106:

detail below. As illustrated in FIG. 2, after detecting the user-interactive elements 108, the detected user-interactive elements 402 are provided to the test generator module 116.

Upon receipt of the detected user-interactive elements 402, the test generator module 116 generates one or more automated user interaction scripts 404 that are useable by the frame rendering system 112 to simulate user interaction with the user-interactive elements 108 of the web page 106. Each of the one or more automated user interaction scripts 404 are browser-specific, in order to simulate the web page 106's rendering performance on different web browsers. Additionally, to simulate different network conditions for a given device, the frame rendering system 112 employs a bandwidth throttle, which may be implemented at least partially in hardware of the computing device 102, such as in the user interaction testing module 118, and is configured to simulate network conditions for individual ones of the one or more automated user interaction scripts 404 (e.g., 2G, 3G, and so forth). In this manner, the test generator module 116 is configured to generate automated user interaction scripts 404 that simulate user interaction with visual elements of a web page. In some implementations, each of the automated user-interaction scripts 404 may be a command line switch useable by the user interaction testing module 118 to generate test results 406. For example, the following example automated user interaction script is representative of a command line switch for simulating user interaction with the web page 106 using a "CHROME" web browser:
-Browsertype=CHROME -Dnewgroup=logs -Dbrowserty-peoptions="--enable-gpu-benchmarking,--enable-thread-composting" -U-Dmonitorlogs=ON In some implementations, the test generator module 116 generates an automated user interaction script 404 for each of the detected user-interactive elements 402. Alternatively, the test generator module 116 may generate a single auto-

```
public void pointerToUserInteractive(Driver driver)
{
    Tasks Tasks = new Tasks(driver);
    tasks.pointerToUserInteractive(driver.findUserInteractive(By.driver(".UserI
    nteractive"))).
    generate( ).execute( );
}
```

In the example script, a carousel visual element is identified in the web page 106 and a test pointer is moved to the identified visual element, which enables the computing device 102 to assign a unique identifier to the identified carousel element for subsequent reporting on the carousel's rendering performance.

In some implementations, the detected user-interactive elements 108 are grouped by the user-interactive element detection module 114 based on a type of action that can be performed on the identified elements. For instance, in an example scenario where the user-interactive element detection module 114 identifies that the web page 106 includes user-interactive elements 108 that can be interacted with via scrolling and clicking inputs, the user-interactive element detection module 114 may generate a first group of scrollable user-interactive elements and a second group of clickable user-interactive elements. Additionally, the user-interactive element detection module 114 may assign a unique identifier to each detected user-interactive element included in the web page 106, such that monitored rendering performance of a particular element may be identified in the rendering performance report 110, as described in further mated user interaction script 404 for each group of detected user-interactive elements generated by the user-interactive element detection module 114.

The detected user-interactive elements 402 and the generated automated user interaction scripts 404 are then communicated to the user interaction testing module 118 to simulate user interaction with the user-interactive elements 108. The user interaction testing module 118 generates an individual test case for each of the detected user-interactive elements 402, identifiable by the unique identifier assigned to each detected user-interactive element, and automatically simulates user interaction with each detected user-interactive element by applying the automated user-interaction script to the element (block 606). The simulation performed by the user interaction testing module 118 is automatic, in that it is performed independent of any user input during the simulation. During the simulation, the user interaction testing module 118 monitors a frame rendering rate of the web page 106 to generate test results 406 (block 608). An example simulation of user interaction with a carousel element of the web page 106 can be achieved using the following script:

```
int counter = 0;
while(Webpage.getUserInteractiveCarousel( ).isUserInteractiveCarouselVisible(dri
ver) && counter < 20)
{
    Webpage.getUserInteractiveCarousel( ).interactUserInteractiveCarousel( );
    counter++;
}
if(counter<20)
{
    Report. log ("The user-interactive element is visible");
}
```

Thus, using the techniques described herein, the user interaction testing module 118 is configured to generate test results 406, which describe a rendering performance for each detected user-interactive element 108 of a web page 106, as simulated by the frame rendering system 112.

The test results 406 describe a rendering performance of the web page for a particular device type and/or network condition parameters. Upon receiving the test results 406, the rendering performance reporting module 120 compares the test results 406 to a rendering threshold and determines whether the simulated user interaction with the user-interactive elements 108 results in a frame rendering rate that satisfies the rendering threshold (block 610). This rendering threshold may in some instances be specified by a user of a computing device implementing the frame rendering system 112. In some implementations, the frame rendering threshold is set to 60 frames per second, which represents a rendering rate that makes changes between rendering individual frames of the web page 106 imperceptible to the human eye. As described herein, the test results 406 may satisfy the rendering threshold if the test results indicate a frame rendering rate that is greater than and/or equal to the rendering threshold. Alternatively or additionally, test results indicating a frame rendering rate that is less than and/or equal to the rendering threshold may be designated as failing to satisfy the rendering threshold.

Given the monitored rendering of the simulated user interaction with user-interactive elements 108 of the web page 106, the rendering performance reporting module 120 generates a rendering performance report 110 for the web page (block 612). FIG. 5 illustrates an example rendering performance report 502 generated by the frame rendering system 112. In the illustrated example, the blue line 504 represents a monitored frame rendering rate of the web page 106 during the user interaction simulated by the user interaction testing module 118, relative to a rendering threshold 506. In the illustrated example, the rendering threshold 506 rate is set at 60 frames per second. The y-axis of the rendering performance report 502 is representative of a recorded frame count per unit of time. Alternatively, the y-axis may be representative of an effective frame rate for an individual tested user-interactive element when the x-axis identifies individual user-interactive elements, as described in further detail below.

The x-axis of the rendering performance report may be representative of a number of measurements taken during a simulation, or may be representative of unique identifiers assigned to the user-interactive elements 108. For instance, in the example rendering performance report 502, the x-axis may indicate that either 14 measurements were taken during the simulated interaction with the web page 106. Alternatively, the x-axis of the example rendering performance report 502 may indicate that the web page 106 includes 14 detected user-interactive elements 402. In this manner, the blue line 504 is representative of a resulting frame rendering rate during simulated user interaction with each of the 14 detected user-interactive elements 402, thereby automatically identifying which user-interactive elements of a web page prohibit the web page from satisfying the rendering threshold.

Given this information, the rendering performance report may additionally specify an overall rendering performance score for the web page 106, which may be computed using Equation 1:

$$\text{Rendering Performance Score} = \int_0^n 1 - \frac{f}{t} \qquad \text{(Eq. 1)}$$

In Equation 1, 'n' is representative of either a total number of measurements taken during the simulation, or of a total number of detected user-interactive elements 402, "f" is representative of a frame count measured by the user interaction testing module 118 during the simulation, and "t" represents the number of frames per second of the rendering threshold. A rendering performance score close to zero indicates that the web page 106 is likely to render at or above the rendering threshold, while a large rendering performance score is indicative of a web page that is unlikely to satisfy the rendering threshold. Thus, a rendering performance report 110 may be leveraged by a web developer to automatically identify issues in web page rendering, and particularly identify individual user-interactive elements that may preclude the web page from satisfying the rendering threshold.

Example System and Device

Figure 7:
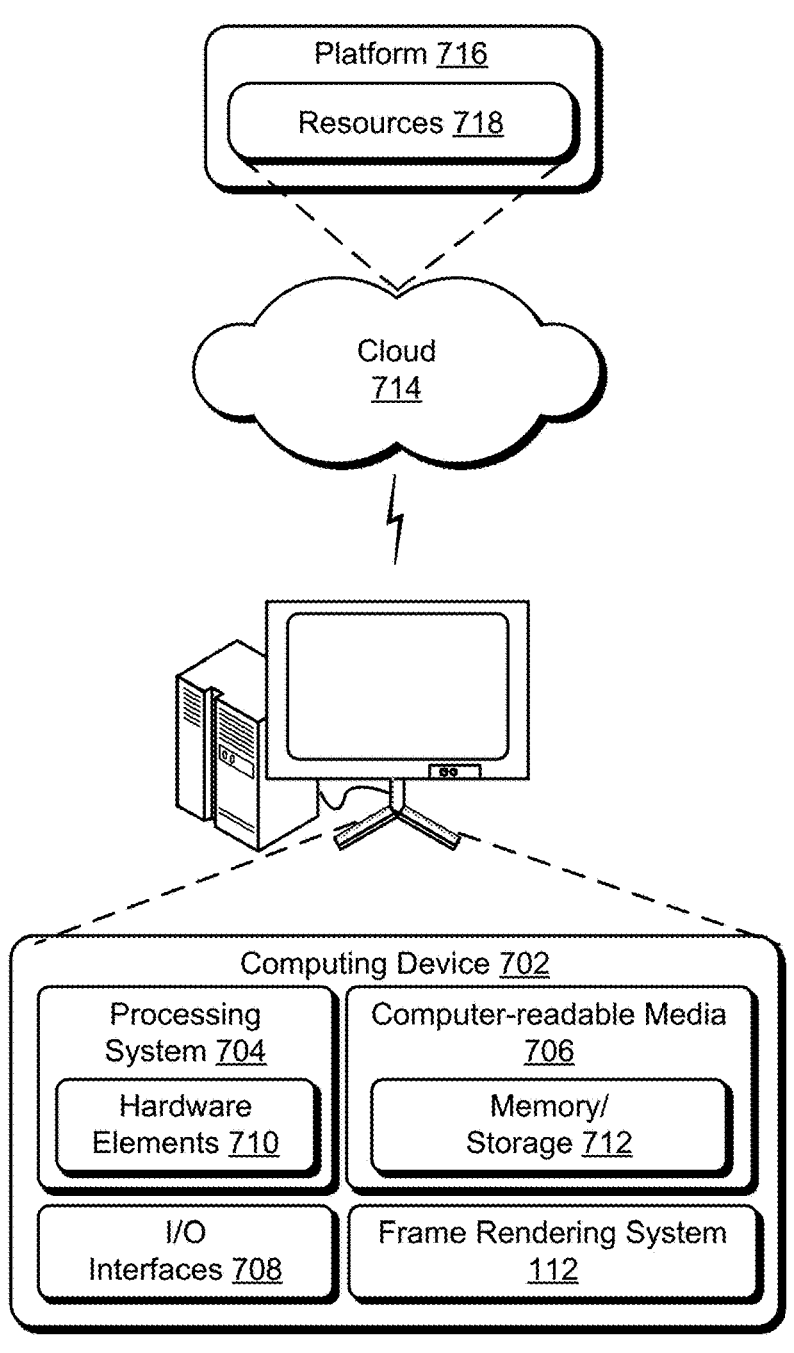
FIG. 7 illustrates an example system including various components of an example device that can be implemented as any type of computing device as described and/or utilize with reference to FIGS. 1-6 to implement embodiments of the techniques described herein.

FIG. 7 illustrates an example system 700 that includes an example computing device 702 that is representative of one or more computing systems and/or devices that may implement the various techniques described herein. This is illustrated through inclusion of the frame rendering system 112. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interfaces 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines, and so forth.

The processing system 704 is representative of functionality to perform one or more operations using hardware. Accordingly, the processing system 704 is illustrated as including hardware element 710 that may be configured as processors, functional blocks, and so forth. This may include implementation in hardware as an application-specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage 712 may include volatile media (such as random access memory (RAM)) and/or nonvolatile media (such as read only memory (ROM), Flash memory, optical disks, magnetic disks, and so forth). The memory/storage 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media.

The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. Resources 718 can also include services provided over the Internet and/or through a subscriber network, such as a cellular or Wi-Fi network.

The platform 716 may abstract resources and functions to connect the computing device 702 with other computing devices. The platform 716 may also serve to abstract scaling of resources to provide a corresponding level of scale to encountered demand for the resources 718 that are implemented via the platform 716. Accordingly, in an interconnected device embodiment, implementation of functionality described herein may be distributed throughout the system 700. For example, the functionality may be implemented in part on the computing device 702 as well as via the platform 716 that abstracts the functionality of the cloud 714.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by at least one computing device, the method comprising:
   identifying, by the at least one computing device, user-interactive elements that are included in a web page;
   simulating, by the at least one computing device, user interaction with the user-interactive elements via a first browser type and user interaction with the user-interactive elements using a second browser type;
   measuring, by the at least one computing device, a number of frames rendered in a timeframe during both the simulated user interaction with the user-interactive elements for the first browser type and the simulated user interaction with the user-interactive elements for the second browser type;
   comparing, by the at least one computing device, the measured number of frames rendered in the timeframe to a threshold frame rendering rate, the threshold frame rendering rate designating whether user interaction with the user-interactive elements provides a satisfactory user experience during the timeframe; and
   outputting, by the at least one computing device, a rendering performance report indicating whether the satisfactory user experience is provided using the first browser type and using the second browser type.

2. The method of claim 1, wherein the rendering performance report includes information describing differences between the simulated user interaction with the user-interactive elements using the first browser type and the simulated user interaction with the user-interactive elements using the second browser type.

3. The method of claim 1, wherein simulating user interaction with the user-interactive elements for the first browser type is performed using a first set of network conditions and simulating user interaction with the user-interactive elements for the second browser type is performed using a second set of network conditions.

4. The method of claim 3, wherein the first set of network conditions comprises a first bandwidth limit and the second set of network conditions comprises a second bandwidth limit that is different than the first bandwidth limit.

5. The method of claim 1, wherein simulating user interaction with the user-interactive elements comprises:
   generating, for each of the user-interactive elements, a test script for automating user interaction with the user-interactive element; and
   applying the generated test scripts to the user-interactive elements.

6. The method of claim 1, wherein simulating the user interaction with the user-interactive elements is performed automatically and independent of user input.

7. The method of claim 1, wherein the simulating comprises determining a rendering performance of one of the user-interactive elements by measuring a number of frames rendered at the one of the user-interactive elements during the simulating user interaction with the one of the user-interactive elements, wherein the rendering performance report includes information identifying the one of the user-interactive elements and describing the rendering performance for the one of the user-interactive elements.

8. The method of claim 1, further comprising identifying that the simulation of user interaction with one of the user-interactive elements fails to satisfy the threshold frame rendering rate for at least one of the first browser type or the second browser type and generating the rendering performance report to include information specifying the one of the user-interactive elements as failing to satisfy the threshold frame rendering rate for the at least one of the first browser type or the second browser type.

9. A computer-readable storage medium having instructions stored thereon that are executable by at least one processor of a computing device to perform operations comprising:
   identifying user-interactive elements that are included in a web page;
   simulating user interaction with the user-interactive elements via a first browser type and user interaction with the user-interactive elements using a second browser type;
   measuring a number of frames rendered in a timeframe during both the simulated user interaction with the user-interactive elements for the first browser type and the simulated user interaction with the user-interactive elements for the second browser type;
   comparing the measured number of frames rendered in the timeframe to a threshold frame rendering rate, the threshold frame rendering rate designating whether user interaction with the user-interactive elements provides a satisfactory user experience during the timeframe; and
   outputting a rendering performance report indicating whether the satisfactory user experience is provided using the first browser type and using the second browser type.

10. The computer-readable storage medium of claim 9, wherein simulating user interaction with the user-interactive elements for the first browser type is performed using a first set of network conditions and simulating user interaction with the user-interactive elements for the second browser type is performed using a second set of network conditions.

11. The computer-readable storage medium of claim 9, wherein simulating user interaction with the user-interactive elements comprises:

generating, for each of the user-interactive elements, a test script for automating user interaction with the user-interactive element; and applying the generated test scripts to the user-interactive elements.

12. The computer-readable storage medium of claim 9, wherein simulating the user interaction with the user-interactive elements is performed automatically and independent of user input.

13. The computer-readable storage medium of claim 9, wherein the simulating comprises determining a rendering performance of one of the user-interactive elements by measuring a number of frames rendered at the one of the user-interactive elements during the simulating user interaction with the one of the user-interactive elements, wherein the rendering performance report includes information identifying the one of the user-interactive elements and describing the rendering performance for the one of the user-interactive elements.

14. The computer-readable storage medium of claim 9, the operations further comprising identifying that the simulation of user interaction with one of the user-interactive elements fails to satisfy the threshold frame rendering rate for at least one of the first browser type or the second browser type and generating the rendering performance report to include information specifying the one of the user-interactive elements as failing to satisfy the threshold frame rendering rate for the at least one of the first browser type or the second browser type.

15. A system comprising:

one or more processors; and a computer-readable storage medium storing instructions that are executable by the one or more processors to perform operations comprising:

identifying user-interactive elements that are included in a web page;

simulating user interaction with the user-interactive elements via a first browser type and user interaction with the user-interactive elements using a second browser type;

measuring a number of frames rendered in a timeframe during both the simulated user interaction with the user-interactive elements for the first browser type and the simulated user interaction with the user-interactive elements for the second browser type;

comparing the measured number of frames rendered in the timeframe to a threshold frame rendering rate, the threshold frame rendering rate designating whether user interaction with the user-interactive elements provides a satisfactory user experience during the timeframe; and outputting a rendering performance report indicating whether the satisfactory user experience is provided using the first browser type and using the second browser type.

16. The system of claim 15, wherein simulating user interaction with the user-interactive elements for the first browser type is performed using a first set of network conditions and simulating user interaction with the user-interactive elements for the second browser type is performed using a second set of network conditions.

17. The system of claim 15, wherein simulating user interaction with the user-interactive elements comprises:

generating, for each of the user-interactive elements, a test script for automating user interaction with the user-interactive element; and applying the generated test scripts to the user-interactive elements.

18. The system of claim 15, wherein simulating the user interaction with the user-interactive elements is performed automatically and independent of user input.

19. The system of claim 15, wherein the simulating comprises determining a rendering performance of one of the user-interactive elements by measuring a number of frames rendered at the one of the user-interactive elements during the simulating user interaction with the one of the user-interactive elements, wherein the rendering performance report includes information identifying the one of the user-interactive elements and describing the rendering performance for the one of the user-interactive elements.

20. The system of claim 15, the operations further comprising identifying that the simulation of user interaction with one of the user-interactive elements fails to satisfy the threshold frame rendering rate for at least one of the first browser type or the second browser type and generating the rendering performance report to include information specifying the one of the user-interactive elements as failing to satisfy the threshold frame rendering rate for the at least one of the first browser type or the second browser type.

* * * * *